United States Patent [19]

Herzl

[11] 4,297,898
[45] Nov. 3, 1981

[54] STABILIZED VORTEX-SHEDDING FLOWMETER

[75] Inventor: Peter J. Herzl, Morrisville, Pa.

[73] Assignee: Fischer & Porter Co., Warminster, Pa.

[21] Appl. No.: 103,490

[22] Filed: Dec. 14, 1979

Related U.S. Application Data

[63] Continuation-in-part of Ser. No. 13,557, Feb. 21, 1979, Pat. No. 4,226,117.

[51] Int. Cl.³ .............................................. G01F 1/32
[52] U.S. Cl. .............................. 73/861.22; 73/861.23
[58] Field of Search ............ 73/861.22, 861.23, 861.24

[56] References Cited

U.S. PATENT DOCUMENTS

| | | | |
|---|---|---|---|
| 3,116,639 | 1/1964 | Bird | 73/861.24 |
| 3,587,312 | 6/1971 | McMurtrie | 73/861.22 |
| 3,881,352 | 5/1975 | McShane | 73/861.23 |
| 3,940,986 | 3/1976 | Yamasaki et al. | 73/861.23 |
| 4,030,355 | 6/1977 | Herzl | 73/861.24 |
| 4,085,614 | 4/1978 | Curran | 73/861.24 |
| 4,226,117 | 10/1980 | Herzl | 73/861.23 |

FOREIGN PATENT DOCUMENTS

| | | | |
|---|---|---|---|
| 50-9015 | 3/1975 | Japan | 73/861.22 |
| 52-132866 | 7/1977 | Japan | 73/861.22 |
| 823684 | 11/1959 | United Kingdom | 73/861.24 |

Primary Examiner—Herbert Goldstein
Attorney, Agent, or Firm—Michael Ebert

[57] ABSTRACT

A stabilized vortex-shedding flowmeter for accurately measuring the flow rate of a liquid or gas conducted through a flow tube. The meter includes a front obstacle transversely mounted across the tube with its longitudinal axis normal to the flow axis of the tube. Supported behind the front obstacle and spaced therefrom by a gap is a rear obstacle constituted by a pair of parallel beams symmetrically disposed with respect to the flow axis and lying in a plane normal thereto. In operation, as the incoming fluid stream is divided by and flows past the front obstacle, a stagnant zone is created in the gap. This zone is initially aligned with the flow axis; but as vortices are successively detached from the front obstacle and appear alternately on either side of the gap, the low pressure produced by each vortex act to draw the stagnant zone in front of the beam adjacent thereto, the fluid then going around and past the other beam and imposing a drag force thereon. Since the vortices alternate, the drag forces imposed on the beams alternate at a rate proportional to the flow rate of the fluid. A transducer system is provided to sense the alternating activity in the tube and to generate a signal whose frequency is linearly related to the flow rate.

12 Claims, 17 Drawing Figures

A = TUBE ID
B = .266 TUBE I.D.
C = .124 TUBE I.D.
D ≈ .143 TUBE I.D.
E = .046 TUBE I.D.
F = .123 TUBE I.D.
G = .302 TUBE I.D.

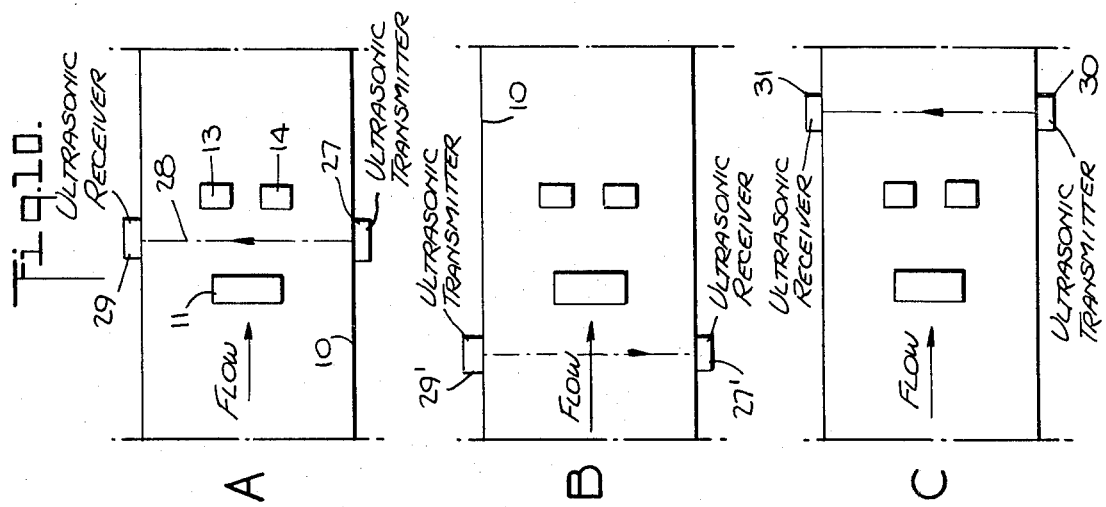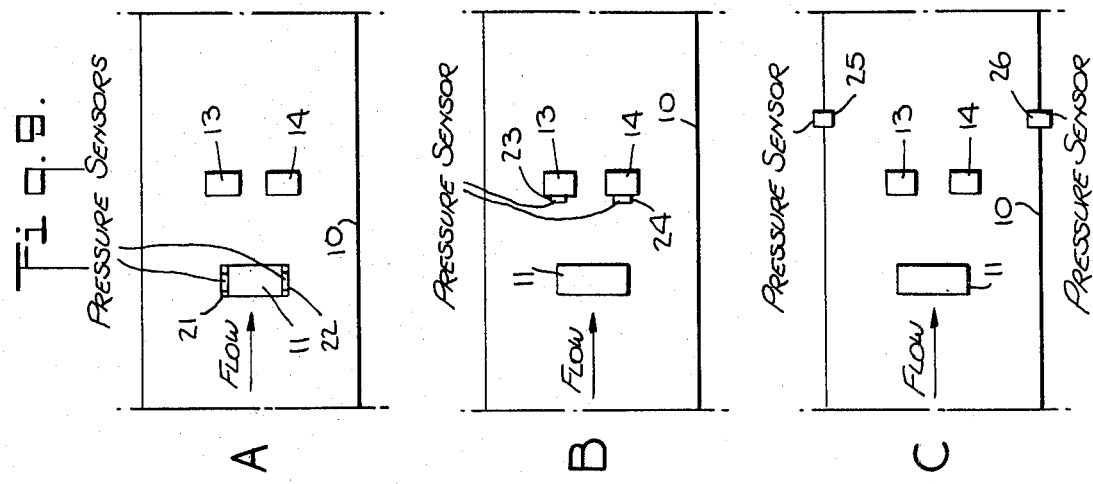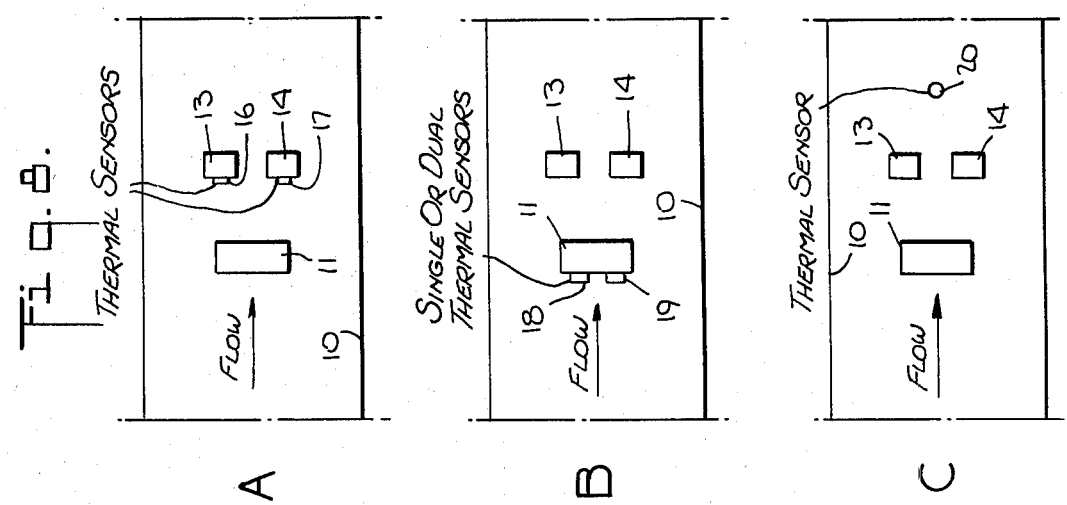

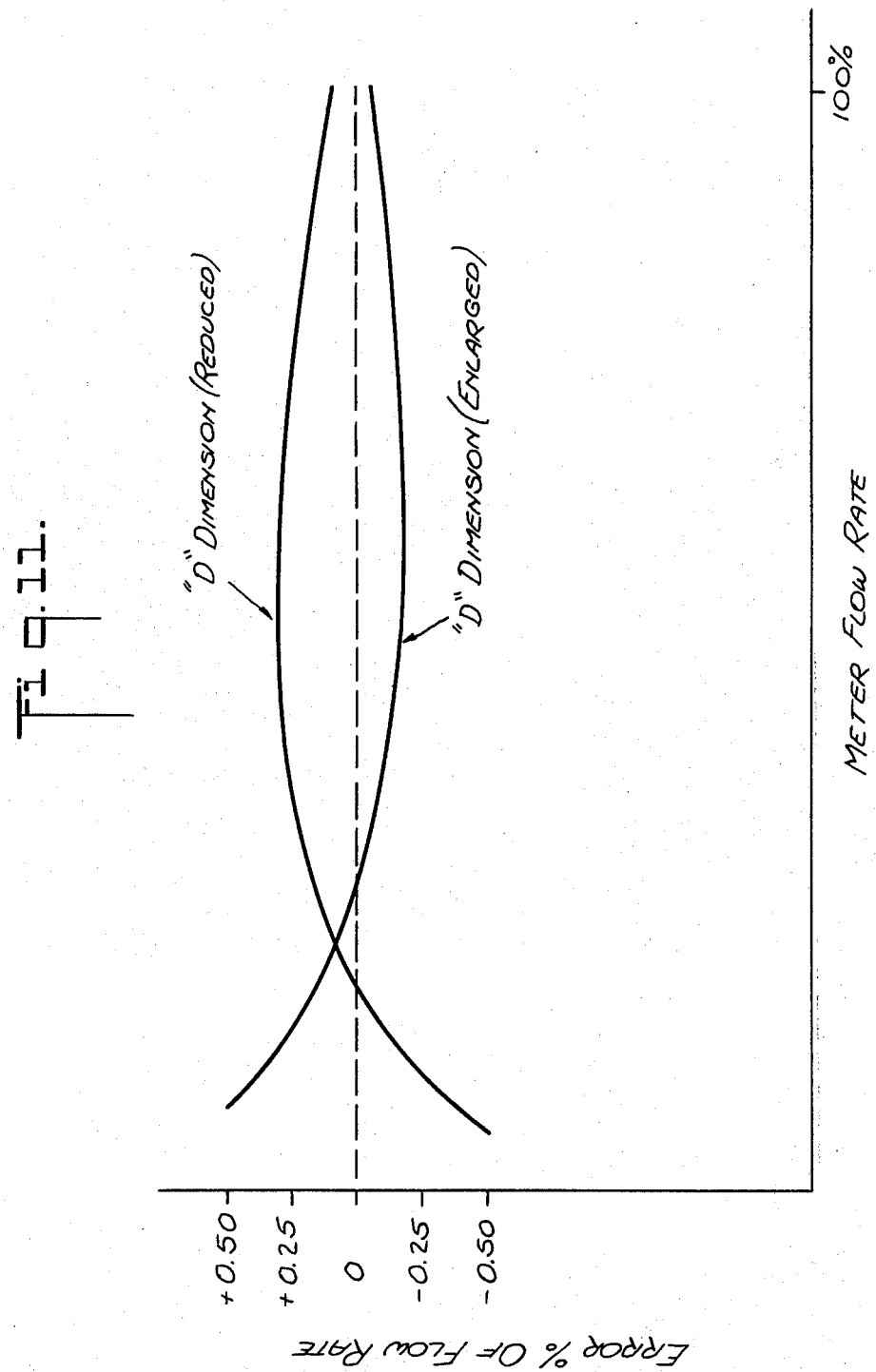

STABILIZED VORTEX-SHEDDING FLOWMETER

RELATED APPLICATION

This application is a continuation-in-part of my copending application Ser. No. 013,557, filed Feb. 21, 1979, now U.S. Pat. No. 4,226,117 entitled "Vortex-Shedding Flowmeter Having Drag-Actuated Torsional Sensor," the entire disclosure of which is incorporated herein by reference.

BACKGROUND OF INVENTION

This invention relates generally to vortex shedding flowmeters, and more particularly to a low-cost flowmeter of this type capable of measuring both liquid and gas flow rates with exceptional accuracy.

When a fluid such as gasoline or natural gas is to be metered, the need for precise measurement becomes more pressing as the market price of the fluid increases. Thus when gasoline or fuel oil was relatively cheap, one was more tolerant of small metering errors, for these were not reflected in significant billing differences. But with the recent sharp rise in the cost of gasoline and fuel oil, purchasers are now insistent that these liquids be more precisely metered so that they are only called upon to pay for the exact amount of liquid supplied to them and no more. By the same token, suppliers of costly liquids also demand precise readings, for flow reading errors may underestimate the amounts supplied to customers and therefore be to the disadvantage of suppliers.

Flowmeters in present use which are capable of affording accurate flow rate readings are mainly of the turbine or of the positive displacement type. In a turbine meter, a rotor lies in the path of a stream which impinges on the rotor blades, imparting a force thereto setting the rotor in motion at a speed proportional to fluid velocity. In a positive-displacement meter, a measuring disc is caused to move in a nutating motion by an advancing volume of liquid.

While both the turbine meter and the positive-displacement meter afford accurate flow measurements when in good working condition, because they make use of moving parts which are subject to fouling by contaminants carried by the fluid being metered; and because the bearings or supports for the moving parts are subject to wear, their accuracy may be impaired by these factors. Moreover, mechanically-operated meters are relatively expensive, the cost of these meters escalating dramatically with more stringent accuracy requirements.

The concern of the present invention is with low-cost vortex-shedding flowmeters capable of metering gas or liquids with a high degree of accuracy. While vortex-shedding flowmeters of the type heretofore known represent a no-moving-parts alternative to turbine and positive displacement meters and do not suffer from the mechanical drawbacks of such meters, the fact is that in terms of accuracy, they fall considerably short of turbine and positive displacement meter performance. Hence before considering the structure and function of a highly linear vortex-shedding flowmeter in accordance with the invention, we shall first briefly review the present state of the art of vortex-shedding meters.

It is well known that under certain circumstances the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate. It is this phenomenon which is exploited to create a vortex-shedding flowmeter to measure the volumetric flow of fluids being treated or supplied in order to carry out various control functions. Flowmeters of this type are disclosed in the Bird patent, U.S. Pat. No. 3,116,639, and in the White patent, U.S. Pat. No. 3,650,152. Existing flowmeters of the vortex shedding type are capable of effecting volumetric or mass flow measurement.

In a vortex-shedding flowmeter, the frequency of shedding is proportional to the velocity of fluid passing through the flow tube containing the shedding body, but only as long as the separation point from which shedding takes place remains fixed and the feedback mechanism causing shedding to transfer from one side of the body to the other remains constant.

In its most elementary form, the shedding body is a simple cylinder mounted across the flow tube. The difficulty experienced with this type of shedding body is that the separation point (i.e., the location at which vortices leave the body) shifts with Reynolds numbers. As a consequence, the vortex trail tends to meander down the flow tube behind the shedding body. If the angle of this vortex trail changes, the feedback mechanism causing shedding to take place from alternate sides of the shedding body also undergoes change, thereby giving rise to deviations from the predicted frequency of the shedder. As a result, meter accuracy and meter repeatability are poor.

Vortex meters are commercially available having shedding bodies which are designed to overcome these drawbacks by optimizing the shedding body width and geometry in relation to the flow tube size. The U.S. Pat. No. 3,572,117 to Rodely discloses a bluff body flowmeter having a prescribed geometric configuration designed to minimize irregularities in the oscillating wake. These meters constitute and improvement over meters having cylindrical shedding bodies. However, under less-than-ideal operating conditions, the vortex wake or trail created by these non-cylindrical shedding bodies will still, on occasion, become intermittent or meander, to produce the same disadvantages encountered with cylindrical bodies.

The Burgess U.S. Pat. No. 3,589,185 discloses an improved form of vortex-type flowmeter wherein the signal derived from the fluid oscillation is relatively strong and stable to afford a favorable signal-to-noise ratio insuring accurate flow-rate information over a fairly broad range. In this meter, an obstacle assembly is mounted in the flow conduit, the assembly being constituted by a block positioned across the conduit with its longitudinal axis at right angles to the direction of fluid flow, a strip being mounted across the conduit behind the block and being spaced therefrom to define a gap which serves to trap Karman vortices and to strengthen and stabilize the vortex street. This street is sensed to produce a signal whose frequency is proportional to flow rate.

In another Burgess Patent, U.S. Pat. No. 3,888,120, dealing with a vortex-type flowmeter, there is disclosed an obstacle assembly constituted by a fixed front section contoured to cause flow separation of the incoming fluid stream whose flow rate is to be measured, and a rear non-streamlined section which is shaped to interfere with the vortex street in the wake of the front section and is cantilevered from the front section to define a gap. The rear section is slightly deflectable relative to the front section whereby it is excited into minute vibrations by the vortex street. These vibrations are sensed by a strain gauge to produce a signal proportional to flow rate.

The liquid vortex flowmeter Model 10 LV 1000, manufactured by the Fischer & Porter Company of Warminster, Pa., the assignee herein, operates in accordance with the principles set forth in Burgess U.S. Pat. No. 3,888,120. This liquid vortex flowmeter constitutes a commercially successful version of a vortex meter utilizing a two-section shedder to create a vortex street. It is an excellent flowmeter whose rate accuracy on low viscosity fluids, such as water, within a broad operating range is about 2%.

However, some flow rate measuring applications require a higher order of accuracy and still broader operating range. Also, in some applications the fluid being measured is subject to viscosity changes, turbulence and other disturbances which adversely affect the accuracy of the readings obtained with meters of the 10 LV 1000 type.

To provide a vortex-type flowmeter in which the frequency of vortex shedding is accurately related to fluid velocity regardless of turbulence, changes in fluid viscosity and other disturbing factors which tend to degrade this relationship, applicant's prior U.S. Pat. No. 4,030,355 (Herzl) discloses a flowmeter whose obstacle assembly is constituted by a fixed front section and a deflectable rear section cantilevered by beams from the front section, the rear section having a central opening therein to provide a fluid passage.

The front section of the Herzl patent flowmeter is contoured to cause flow separation of the incoming fluid, thereby dividing the stream to create a series of vortices that alternate with respect to the center line of the front section. As the vortices detach themselves from the front section, alternate areas of low pressure are created that shift from side-to-side, producing an oscillating thrust behind the front section and causing the deflectable rear section to swing periodically at a frequency proportional to the incoming fluid velocity. This swing is sensed by a strain gauge mounted on a beam from which the rear section is cantilevered.

The central opening in the rear section permits the flow of fluid therethrough and acts to smooth out turbulence behind the front section to a degree sufficient to create an orderly vortex trail straight down the center of the flow tube. This central passage significantly improves the accuracy and repeatability of the flowmeter.

In a vortex-shedding flowmeter of the Herzl patent type, the deflectable rear section is relatively heavy; and while this flowmeter has excellent hydraulic characteristics, it is quite sensitive to acceleration effects. Though it is possible to partially balance out these undesirable acceleration effects, some unbalance always remains.

Moreover, while the Herzl patent flowmeter design is generally effective in liquid flow rate measurement, it is not generally acceptable for metering gas flow. The reason for this limitation is that in liquid use, relatively large forces are generated by the vortices, whereas in gas flow measurement, the generated forces are smaller by many orders of magnitude, and the meter sensitivity is insufficient to respond effectively thereto, particularly if fading is encountered in the fluidic oscillations, as is sometimes the case.

SUMMARY OF INVENTION

Accordingly, the main object of this invention is to provide a low cost vortex-shedding flowmeter which is effective and accurate in both liquid and gas flow measurement, the frequency of vortex shedding being accurately related to fluid velocity, regardless of fading, turbulence, changes in fluid velocity and other disturbances which in prior vortex-shedding meters tend to degrade this relationship.

Also an object of the invention is to provide a vortex-shedding meter whose linearity is adjustable to obtain an optimum degree of meter accuracy.

Yet another object of this invention is to provide a vortex-shedding meter which is responsive to vortices generated either by liquid or gaseous streams to provide a meter having extremely high accuracies of better than $\pm 0.25\%$ of flow rate over more than a 15 to 1 flow range, this degree of accuracy comparing favorably with the very best turbine and positive displacement meters.

Briefly stated, these objects are attained in a stabilized vortex-shedding flowmeter for accurately measuring the flow rate of a liquid or gas conducted through a flow tube, the meter including a front obstacle transversely mounted across the tube with its longitudinal axis normal to the flow axis of the tube. Supported behind the front obstacle and spaced therefrom by a gap is a rear obstacle constituted by a pair of parallel beams symmetrically disposed with respect to the flow axis and lying in a plane normal thereto.

In operation, as the incoming fluid stream is divided by and flows past the front obstacle, a stagnant zone is created in the air gap that is initially aligned with the flow axis. But as vortices are successively detached from the front obstacle and appear alternately on either side of the gap, the low pressure produced by each vortex acts to draw the stagnant zone in front of the beam adjacent thereto, the fluid then going around and past the other beam and imposing a drag force thereon. Since the vortices alternate, drag forces imposed on the beams alternate at a rate proportional to the flow rate of the fluid. A transducer system is provided to detect the alternating activity in the tube to produce a signal whose frequency is linearly related to the flow rate.

OUTLINE OF DRAWINGS

For a better understanding of the invention as well as other objects and further features thereof, reference is made to the following detailed description to be read in conjunction with the accompanying drawings, wherein.

Figure 3:
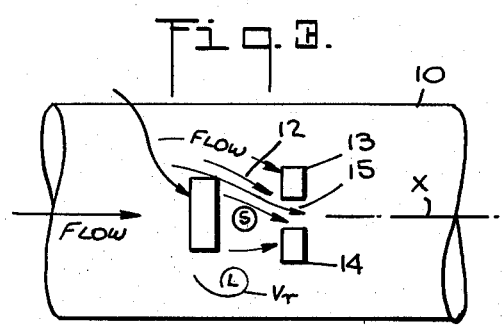
Figure 4:
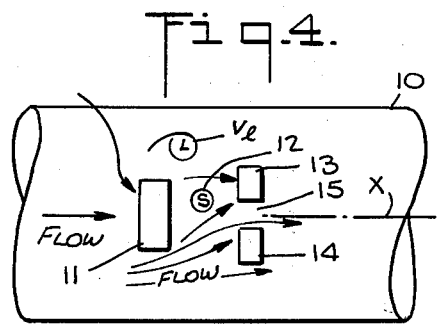
Figure 5:
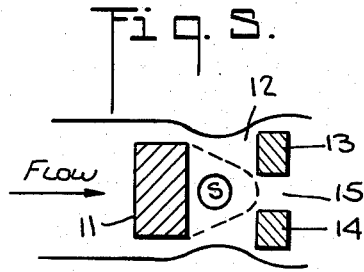
Figure 6:
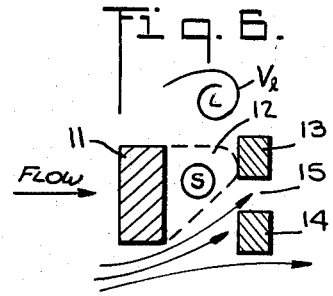
Figure 7:
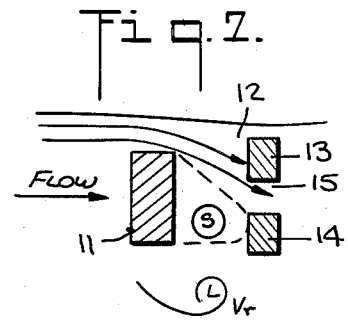

FIG. 3 schematically illustrates the behavior of the meter when a vortex is detached from one edge of the shedding body;

FIG. 4 schematically illustrates the behavior of the same meter when a vortex is detached from the other edge of the body;

FIGS. 5, 6 and 7 schematically illustrate three successive stages in the operation of the meter;

FIGS. 8A, B and C schematically illustrate three thermal sensor arrangements for use in conjunction with the meter;

FIGS. 9A, B and C schematically illustrate three pressure sensor arrangements for the meter;

FIGS. 10A, B and C schematically illustrate three ultrasonic sensor arrangements for the meter; and FIG. 11 is a curve showing the relationship of meter flow rate and the percentage of error in the reading of flow rate.

DESCRIPTION OF INVENTION

Figure 2:
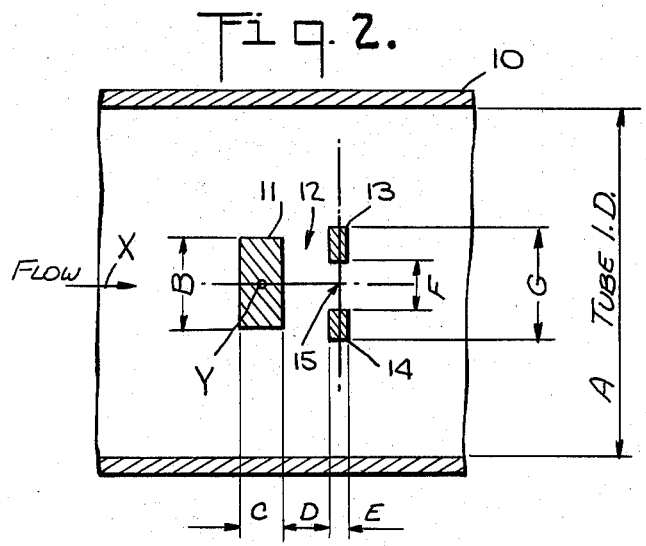
FIG. 2 is a longitudinal section taken through the flowmeter.
Figure 1:
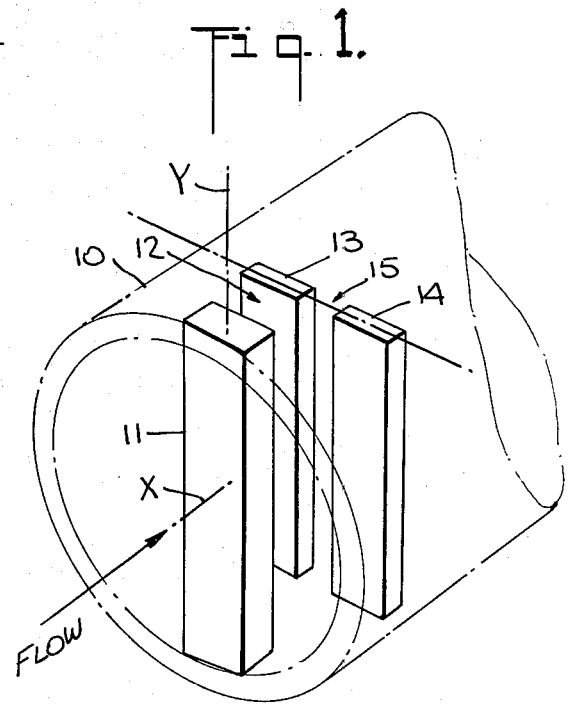
FIG. 1 is a schematic view, in perspective, of a stabilized vortex-shedding flowmeter in accordance with the invention.

Meter Structure:

Referring now to FIGS. 1 to 2, there is shown a flow meter of the vortex-shedding type in accordance with the invention, the meter including a flow tube 10 which, in practice, is interposed in the line carrying a liquid or gas whose flow is to be metered.

Mounted transversely within flow tube 10 (shown as having a circular cross-section) is a bluff body or front obstacle 11 having a rectangular cross-section. The longitudinal axis Y of the front obstacle is perpendicular to the longitudinal flow axis X of the tube. Incoming flow which impinges on front obstacle 11 is divided thereby, producing fluidic perturbations in the form of a Karman vortex street. The front obstacle or shedding body may be in any known effective form and have a geometry of the type disclosed in the above-identified patents.

Supported within flow tube 10 behind front obstacle 11 and spaced therefrom by a gap 12 is a rear obstacle constituted by a pair of parallel beams 13 and 14 symmetrically disposed with respect to flow axis X and lying in a plane Z normal thereto. The space between beams 13 and 14 define an open passage 15. A transducer system is provided, various forms of which are shown in FIGS. 8, 9 and 10, to sense the fluidic activity arising in the tube as a result of vortex shedding and to generate a signal whose frequency is linearly related to the flow rate.

In a preferred embodiment of this vortex shedding structure the overall geometry of the assembly formed by the front and rear obstacles is related to the internal diameter of tube 10 and is very short to provide a low-cost, simplified construction of exceptional stability.

As shown in FIG. 1, dimension A represents the internal diameter of flow tube 10, dimension B the width of the rectangular front obstacle 11, and dimension C the thickness of this obstacle. Dimension D represents the size of gap 12, dimension E the thickness of beams 13 and 14 in the rear obstacle, dimension F the spacing 15 between the beams, and G the overall width of the rear obstacle.

The length of the obstacle assembly in the X axis direction is determined by C+D+E. In the embodiment shown, this length is substantially shorter than the shedding assemblies presently used in commercially available vortex meters such as the LVI. This short length, which makes possible a shorter meter having excellent performance characteristics, is of particular economic importance in large flowmeter sizes.

In a preferred embodiment of the invention, dimension B is equal to 0.266 of the tube I.D. and dimension C is equal to 0.124 of the tube I.D. Dimension D, which represents the size of the gap, is about 0.143 of the tube I.D. Dimension D, as explained later in greater detail, is adjustable to optimize the linearity of the meter. Dimension E is equal to 0.046 of the tube I.D., dimension F is equal to 0.123 of the tube I.D., and dimension G is equal to 0.302 of the tube I.D. This configuration is inherently capable of producing extremely high accuracies of better than 0.25% of flow rate over more than a 15 to 1 flow range.

Operation:

In FIG. 3, the dual obstacle assembly is schematically represented by rectangular element 11, and the pair of beams 13 and 14 by smaller rectangular elements behind shedder 11 to define gap 12. The incoming fluid to be metered is divided by front obstacle 11 into two streams passing by the opposing edges of the shedder to produce vortices alternately on one side and then on the other side of gap 12 at a repetition rate proportional to the flow rate.

As a result of this shedding action, a moving train of vortices $V_r$ travels down the right side, and a moving train of vortices $V_l$ travels down the left side of flow tube 10. As the fluid streams flow past front obstacle 11, a stagnant zone S is developed in gap 12, which zone is initially aligned with the flow tube axis X.

FIG. 3 shows a single vortex $V_r$ on the right side of the flow tube adjacent gap 12, this vortex creating a low pressure region L. Low pressure region L acts to displace the stagnant zone S from tube axis X and to draw it in the direction of the low pressure region L to a stable position in front of beam 14 of the rear obstacle. As a consequence of such stagnant zone displacement, the incoming fluid is caused to flow around and past the other beam 13 and through the open passage between the beams to create a drag force on beam 13.

In FIG. 4, the situation is reversed; for now we have the succeeding vortex $V_l$ which appears on the left side of flow tube 10 adjacent gap 12 to develop a low pressure region L which pulls stagnant zone S to a stable position in front of beam 13. In this case, the incoming fluid is caused to flow around and past beam 14 and through the open passage 15 between the beam to develop a drag force on beam 14.

As shown in FIG. 5, the flow does not appear to be stable, in that flow from one or the other edge of front obstacle 11 seeks to go through the open passage 15 between beams 13 and 14. This condition is comparable to an electrical flip-flop which lacks a stable center position. Because the stagnant zone S in gap 12 naturally seeks to shift toward beam 13 or 14, a somewhat unstable condition exists in the absence of vortices.

When, however, a vortex $V_r$ appears on the right side of gap 12 and a vortex $V_l$ thereafter appears on the left side of gap 12, the resultant low pressure regions L act to bias the fluidic forces. A relatively small pressure force causes stagnant zone S to switch from side to side as alternative vortices are shed. Once the stagnant zone S has switched to a position in front of beam 13 (FIG. 6) or in front of beam 14 (FIG. 7), the other beam is exposed to the full drag force.

Since the shedding action only acts to steer stagnant zone S which tends to be bi-stable, then even a small vortex of the type encountered when fading occurs is able to switch stagnant zone S to the appropriate beam position.

In other words, when strong vortices are produced under normal operating conditions, a stagnant zone S is alternately switched from beam-to-beam in a positive manner; but when, as occasionally happens, fading gives rise to weaker vortices, switching nevertheless continues to take place. As a consequence, a very even and uniform signal output is obtained, regardless of the varying strength of the fluidic vortices developed in the flow tube.

Sensing:

The use of thermal sensors to detect vortices in a vortex-shedding flowmeter is known and is disclosed, for example, in the Rodley U.S. Pat. No. 3,572,117. Such thermal sensors take the form of temperature-responsive electrically-heated resistance elements whose resistance is caused to vary as a function of a cooling fluidic flow in the vicinity thereof to produce a varying current, thereby converting the fluidic oscillations detected by the sensor into a corresponding electrical signal.

With an obstacle assembly in accordance with the invention as shown in FIG. 8A, a pair of thermal sensors 16 and 17 are mounted on the front face of beams 13 and 14, each sensor producing a signal representing flow rate.

Alternatively, as shown in FIG. 8B, thermal sensors 18 and 19 may be placed on the front face of front obstacle 11 adjacent opposite sides thereof; or, as shown in FIG. 8C, a single thermal sensor 20 may be placed downstream of the dual-obstacle assembly. Since fluidic oscillations at a rate in accordance with the flow velocity of the fluid being metered are developed at various points in the region of the dual-obstacle assembly and in the vicinity thereof in the flow tube, the proper placement of the thermal sensors may be empirically determined by finding those sites which give the best signals.

Rather than use thermal sensors to pick up the fluidic oscillations, use may be made of pressure transducers of the piezoelectric or any other known type.

To this end, as shown in FIG. 9A, a pair of pressure sensors 21 and 22 may be mounted on opposite sides of the front obstacle 11. Or, as shown in FIG. 9B, a pair of pressure sensors 23 and 24 may be mounted on the front face of beams 13 and 14 of the rear obstacle to sense the drag forces imposed thereon. Or, as shown in FIG. 9C, pressure sensors 25 and 26 mounted on tube 10 may be placed at diametrically-opposed downstream positions to sense pressures produced at these sites by alternately-developed vortices.

In the transducer arrangement shown in FIG. 10A, sensing is effected by an ultrasonic transmitter 27 so mounted on tube 10 to project an ultrasonic beam in a path 28 traversing the tube in the gap 12 between the front obstacle 11 and rear obstacle beams 13 and 14. This ultrasonic beam is intercepted by an ultrasonic receiver 29 on the opposite side of the tube. Fluidic vortices crossing the ultrasonic beam path 28 modify the transmission characteristics of the medium and thereby amplitude modulate the signal yielded by receiver 29 to produce a signal representing flow rate.

Alternatively, as shown in FIG. 10B, an ultrasonic beam may be caused to traverse tube 10 at a position in advance of front obstacle 11, use being made in this instance of an ultrasonic transmitter 28' and an ultrasonic receiver 27'. Finally, as shown in FIG. 10C, the ultrasonic beam may be caused to traverse tube 11 at a downstream position therein behind the dual obstacle assembly, use in this instance being made of an ultrasonic transmitter 30 and a receiver 31.

It will be appreciated that any known form of vortex transducer may be used in conjunction with the dual-obstacle assembly meter in accordance with the invention.

Linearity:

In producing a vortex meter in accordance with the invention, normal manufacturing tolerances would typically result in accuracies of ±0.5% of flow rate, rather than the ±0.25% of which the meter is inherently capable. Since it is not always clear what factors are responsible for minor errors, in order to produce the meters using normal factory procedures and without imposing more stringent tolerances, a method of fine tuning or adjusting the error curve is desirable.

The curve in FIG. 11, which plots the error percentage against meter flow rate, shows how adjustment of the error curve can be effected simply by a minor change in dimension "D" which is the size of air gap 12 between the front and rear obstacles. This curve shows the effect of changing dimension "D" on a meter error curve for a meter with little or no initial error. It will be evident from FIG. 12 that a meter with an initial error can be greatly improved by changing the "D" dimension.

While there has been shown and described a preferred embodiment of a stabilized vortex shedding flowmeter in accordance with the invention, it will be appreciated that many changes and modifications may be made therein without, however, departing from the essential spirit thereof.

I claim:

1. A stabilized vortex-shedding flowmeter comprising:
   A. a flow tube through which a fluid stream to be metered is conducted, said tube having a longitudinal flow axis;
   B. a front obstacle having a predetermined geometry transversely disposed in said tube to divide the fluid stream therein and to cause vortices to be shed alternately on either edge thereof at a repetition rate proportional to the flow rate of the fluid, thereby producing downstream trains of vortices moving along the right and left sides of the tube;
   C. a rear obstacle fixedly supported in the tube behind the front obstacle and mechanically disconnected from the front obstacle to define an unobstructed gap therewith, said rear obstacle being constituted by a pair of parallel relatively broad beams symmetrically disposed with respect to the flow axis and lying in a plane normal thereto, the beams being restrained to remain in a plane transverse to the flow axis, the divided fluid stream, as it flows past the front obstacle, developing a stagnant zone in the gap that is initially aligned with the flow axis; but as vortices are successively detached from the front obstacle and appear alternately on either side of the gap, the low pressure produced by each vortex acts to draw the stagnant zone in front of the beam adjacent thereto, the fluid then going around and past the other beam and imposing a drag force thereon, the drag forces on the beams alternating at a flow rate proportional to flow rate to produce an alternating movement of the stagnant zone that is bi-stable regardless of fading, turbulence and other disturbances; and
   D. transducer means for sensing said alternating movement in said tube to produce a corresponding electrical signal.

2. A flowmeter as set forth in claim 1, wherein said transducer means are constituted by at least one thermal sensor.

3. A flowmeter as set forth in claim 2, wherein two thermal sensors are respectively mounted on the front faces of the two beams of the rear obstacle.

4. A flowmeter as set forth in claim 1, wherein two thermal sensors are mounted on the front face of said front obstacle.

5. A flowmeter as set forth in claim 2, wherein the thermal sensor is mounted downstream in the tube behind the rear obstacle.

6. A flowmeter as set forth in claim 1, wherein said transducer means are constituted by at least one pressure sensor.

7. A flowmeter as set forth in claim 6, wherein a pair of pressure sensors are mounted on opposite sides of the front obstacle.

8. A flowmeter as set forth in claim 6, wherein a pair of pressure sensors are respectively mounted on the front faces of the two beams of the rear obstacle.

9. A flowmeter as set forth in claim 6, wherein a pair of pressure sensors are mounted in said tube at a downstream position beyond the rear obstacle.

10. A flowmeter as set forth in claim 1, wherein said transducer means is constituted by an ultrasonic system provided with a transmitter on one side of the tube to project an ultrasonic beam across the tube at a position at which the beam is modulated by vortices passing through the tube, and a receiver on the other side of the tube to intercept the modulated beam.

11. A flowmeter as set forth in claim 10, wherein said ultrasonic beam is placed to extend through said gap.

12. A flowmeter as set forth in claim 10, wherein said ultrasonic beam is placed downstream of said rear obstacle.

* * * * *